(12) United States Patent
Cunefare et al.

(10) Patent No.: US 7,703,790 B2
(45) Date of Patent: Apr. 27, 2010

(54) ANTI-JACKKNIFING TRACTOR TRAILER SYSTEM

(76) Inventors: Don Cunefare, 640 S. Andressen Dr., Escondido, CA (US) 92029; Casimir Pawlowski, 640 S. Andressen Dr., Escondido, CA (US) 92029

( * ) Notice: Subject to any disclaimer, the term of this patent is extended or adjusted under 35 U.S.C. 154(b) by 0 days.

(21) Appl. No.: 11/796,697

(22) Filed: Apr. 27, 2007

(65) Prior Publication Data
US 2007/0252358 A1    Nov. 1, 2007

(51) Int. Cl.
B62D 53/06    (2006.01)
(52) U.S. Cl. ........................... 280/432; 280/433
(58) Field of Classification Search ............... 280/432, 280/433
See application file for complete search history.

(56) References Cited

U.S. PATENT DOCUMENTS

| | | | | |
|---|---|---|---|---|
| 2,499,013 A * | 2/1950 | Wood | 280/432 |
| 3,733,090 A * | 5/1973 | Keller | 280/432 |
| 3,963,265 A | 6/1976 | Kornoelje et al. | 280/432 |
| 4,065,149 A | 12/1977 | Roth | 280/432 |
| 4,119,330 A | 10/1978 | Capps | 280/432 |
| 4,204,700 A | 5/1980 | Haines, Sr. | 280/432 |
| 4,241,934 A | 12/1980 | Buehner | 280/432 |
| 4,281,846 A | 8/1981 | Hall | 280/432 |
| 4,313,616 A * | 2/1982 | Howard | 280/455.1 |
| 4,341,395 A * | 7/1982 | Miller et al. | 280/432 |
| 4,585,248 A * | 4/1986 | Miller et al. | 280/432 |
| 4,706,984 A * | 11/1987 | Esler et al. | 280/432 |
| 4,991,863 A | 2/1991 | Hosmer | 280/432 |
| 5,069,472 A * | 12/1991 | Parr et al. | 280/433 |
| D323,804 S | 2/1992 | Randolph | D12/161 |
| 5,456,483 A * | 10/1995 | Madsen et al. | 280/432 |
| 5,690,347 A | 11/1997 | Juergens et al. | 280/432 |
| 5,912,616 A | 6/1999 | Valentino | 340/431 |
| 5,957,476 A | 9/1999 | Simpson | 280/432 |
| 6,340,167 B1 | 1/2002 | Boyd | 280/432 |
| 6,401,876 B1 | 6/2002 | Boros | 188/5 |
| 7,175,194 B2 * | 2/2007 | Ball | 280/432 |

* cited by examiner

Primary Examiner—Lesley D. Morris
Assistant Examiner—Maurice Williams
(74) Attorney, Agent, or Firm—Mintz, Levin, Cohn, Ferris, Glovsky & Popeo, P.C.

(57) ABSTRACT

An anti-jackknifing system is provided for tractor trailers. The anti-jackknifing system includes pressure vessels mounted to the tractor for extending and retracting pins. The pins are positioned adjacent to the trailer kingpin so as to extend or retract into slots formed in plates mounted to the apron of the trailer. A controller is provided for automatically extending or retracting the pins based upon speed measurements made by a speed sensor such as the tractor's speedometer or separate GPS sensor. The controller connects to the speed sensor and pressure vessels and causes the pins to project into the race plate slots in the event that the vehicle exceeds a predetermined speed threshold and causes the pins to retract from the race plate slots in the event the vehicle has reduced its speed below a predetermined threshold.

20 Claims, 6 Drawing Sheets

ANTI-JACKKNIFING TRACTOR TRAILER SYSTEM

BACKGROUND OF THE INVENTION

Figure 1:
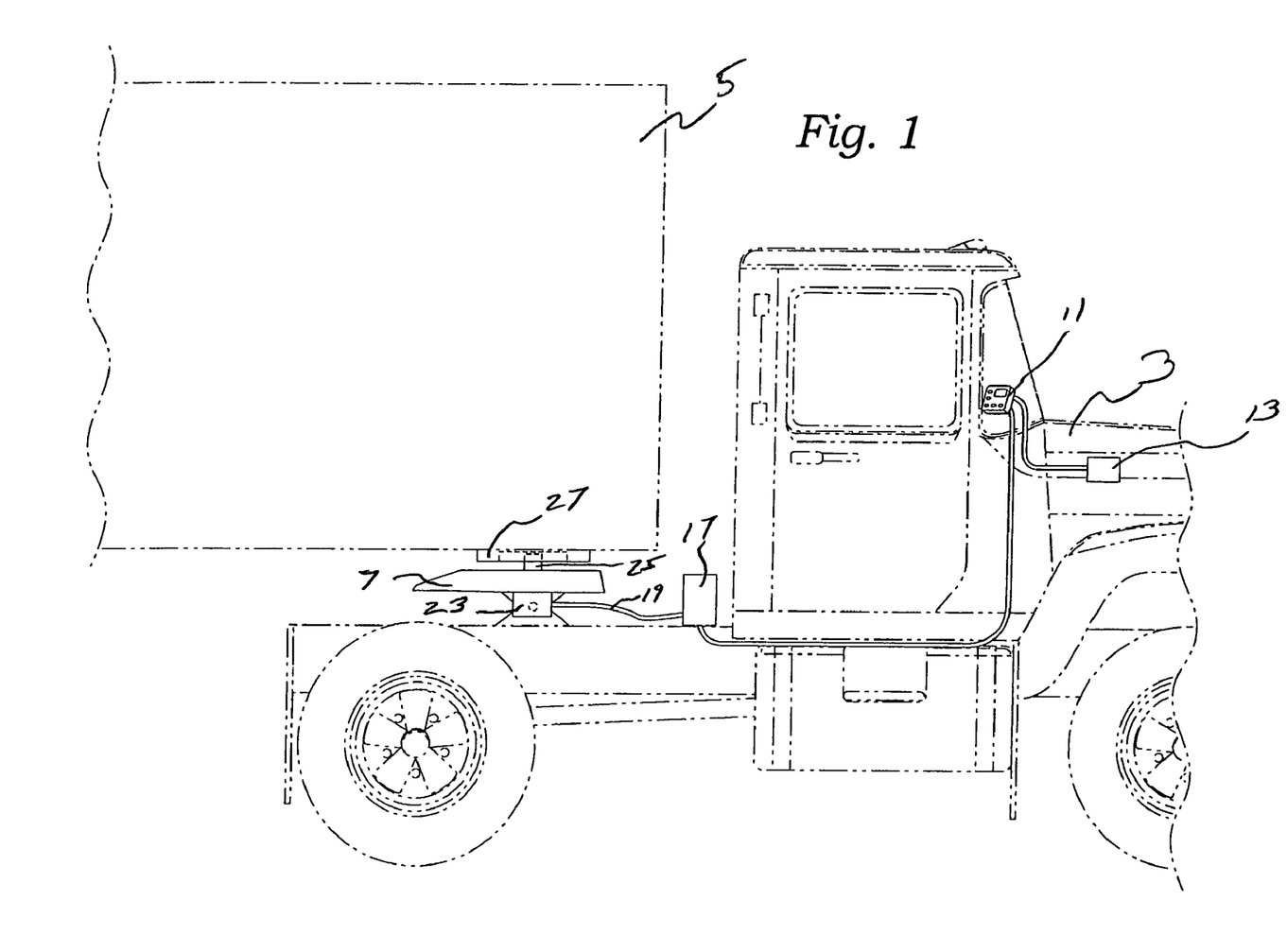
FIG. 1 is a side view of the tractor trailer combination employing an anti-jackknifing system of the present invention.
Figure 2:
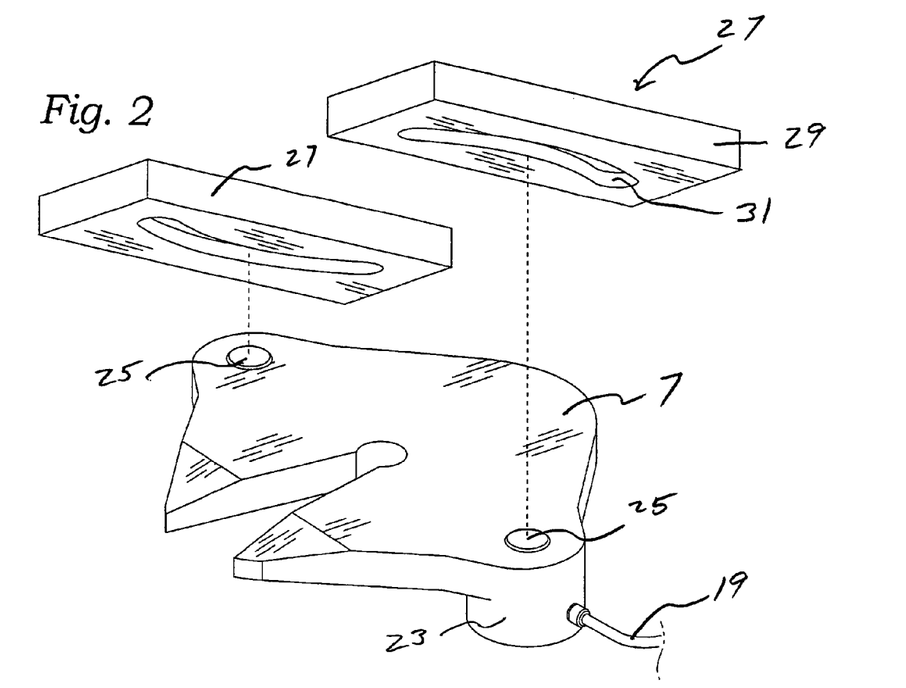
FIG. 2 is an exploded perspective view illustrating an anti-jackknifing system of the present invention wherein pressure vessels are incorporated into the fifth wheel.
Figures 3, 4:
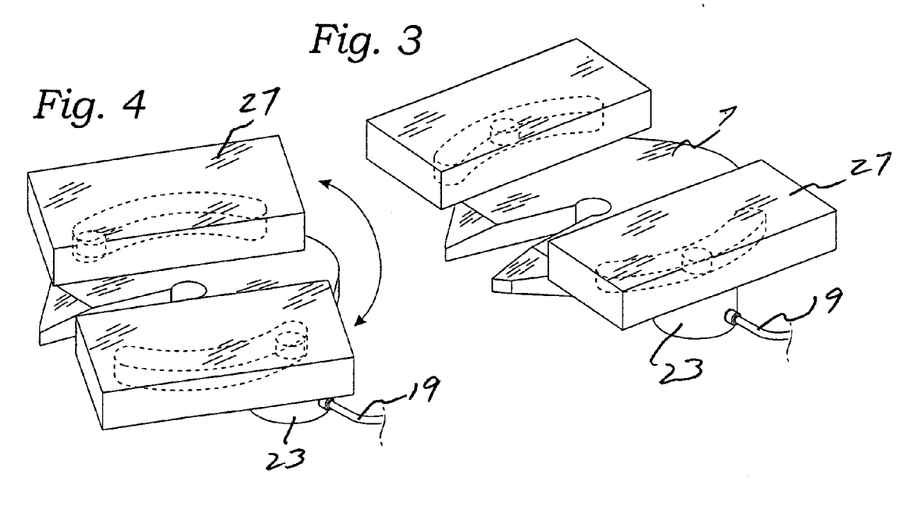
FIG. 3 is a perspective view illustrating the anti-jackknifing system shown in FIG. 2 wherein pins project into slots formed in the race plates.
FIG. 4 is a perspective view illustrating the anti-jackknifing system shown in FIG. 3 wherein an unseen trailer has rotated relative to an unseen tractor.
Figure 5:
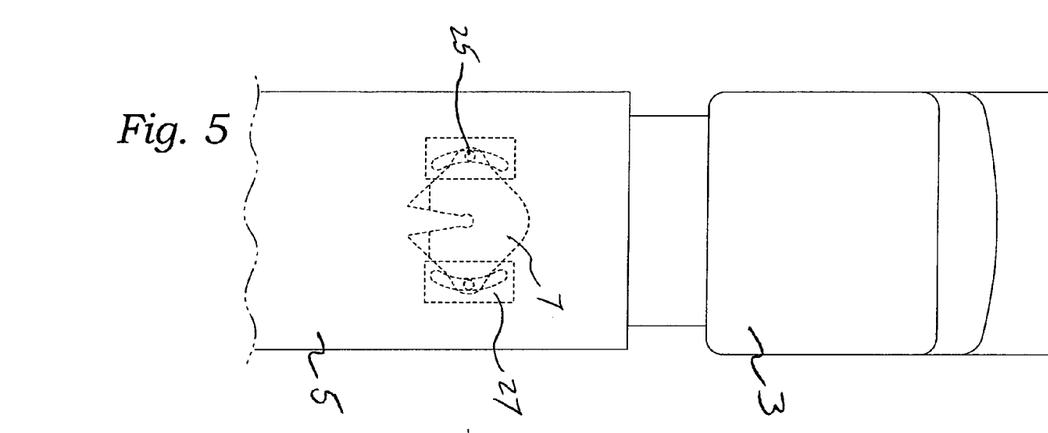
FIG. 5 is a perspective view illustrating a tractor trailer combination of the prior art without the anti-jackknifing system of the present invention in a jackknifing condition.

The present invention relates to safety devices for tractor trailer combinations. More particularly, the present invention relates to safety systems for inhibiting the propensity of a tractor trailer to jackknife under undesirable driving conditions as illustrated in FIG. 5.

Tractors and trailers are conventionally coupled together by a fifth wheel coupler on the tractor in which a kingpin secured to the trailer is pivotally received. The trailer is articulated to the tractor by the kingpin extending from a first plate on the trailer to a second plate on the tractor so as to permit the trailer to rotate or swing horizontally about the kingpin, thereby permitting the trailer to extend at an angle with respect to the line of tractor travel when the assembly traverses curves or turns. This coupling enables the tractor to pull the trailer and provides for relative pivotal movement for maneuvering the vehicle.

One of the problems associated with operation of trailer trucks is the tendency of the tractor and attached trailer to jackknife under certain conditions. Jackknifing occurs when the trailer pivots relative to the tractor to an extent such that the operator can no longer maintain or recover control over the vehicle. Typical driving conditions which may cause jackknifing are those in which the tractor wheels are made to lock and slide or to spin. As shown in FIG. 5, the direction of the vehicle can no longer be controlled, and the vehicle takes the path of least resistance. Improper braking or steering and accelerating or decelerating too fast can all cause jackknifes, especially on roads made slick by rain, snow, or ice.

Many systems have been proposed to prevent or at least to inhibit trailer jackknifing. For example, an assembly of anti-lock or ABS brakes acting on the wheels of the trailer and/or the tractor is employed to prevent jackknifing. The typical ABS system attempts to prevent axle lockup and otherwise to prevent excessive trailer overrunning and consequent jackknifing. ABS systems are rather complicated and difficult and expensive to install, particularly in a retrofit operation because they must be bodily incorporated into the truck's braking system. Moreover, many drivers are leery of ABS systems because they inevitably take a degree of braking control away from the driver. ABS systems also necessarily act between the wheels and the road rather than directly on the trailer and therefore have only a secondary effect on trailer jackknifing.

Many additional systems have been proposed which attempt to prevent or inhibit trailer jackknifing by acting directly on the fifth wheel or elsewhere on the trailer body to prevent or at least inhibit excessive trailer swinging. However, all such systems exhibited marked drawbacks and disadvantages and never gained widespread commercial acceptance. Throughout the years, a number of innovations have been developed relating to anti-jackknife devices, and the following U.S. Pat. Nos. are representative of some of those innovations: U.S. Pat. Nos. 5,690,347; 4,991,863; and 5,456,483.

U.S. Pat. No. 5,690,347 describes a computer controlled braking system including brakes which act directly on the trailer body in response to sensors which detect a jackknifing condition. U.S. Pat. No. 4,991,863 describes a system for preventing jackknifing between a tractor and trailer including blocks formed on the tractor and trailer which prevent angular movement between the tractor and trailer. U.S. Pat. No. 5,546,483 describes a structure for limiting jackknifing including a system of pins which extend from the fifth wheel assembly to project into arcuate slots. Unfortunately, each of theses systems suffer from various disadvantages. For example, prior art systems either require activation of the braking system to occur prior to the safety system being implemented or require continual oversight by the driver. For example, the anti-jackknifing system described in U.S. Pat. No. 5,456,483 initiates when the driver has applied his brakes. Unfortunately, jackknifing can occur even prior to a braking condition such as where a truck is driving on slippery or icy conditions. Moreover, the system described in this patent must be manually deactivated during certain driving condition such as parking.

Thus, there is a significant need for an improved anti-jackknifing system for tractor trailer combinations which does not require continuous oversight by the driver.

There is also a need for an anti-jackknifing system for tractor trailers which is inexpensive to manufacture.

Furthermore, it would be advantageous to provide an anti-jackknifing system that could be employed in new tractor trailers and which could be integrated and retrofit into existing tractor trailers.

SUMMARY OF THE INVENTION

Briefly, in accordance with the invention, I provide an improved anti-jackknifing system for tractor trailer combinations. The anti-jackknifing system includes a pneumatic or hydraulic pressure vessel for controlling the extension and retraction of pins. The pressure vessels are mounted to the tractor adjacent to the fifth wheel or are integrated into the fifth wheel plate. The pressure vessels may be pneumatic or hydraulic and pressure may be provided by various means known to those skilled in the art including separate air compressors or air storage tanks, or may incorporate the tractor's primary or secondary air tank for controlling the extension and retraction of pins. These pins in turn are constructed to project upwardly, when desired, into slots formed in race plates which are welded to the underside of a trailer. The anti-jackknifing system may include only a single pin and a corresponding single race plate having an arcuate slot in the form of a partial circle sized for receiving an extended pin. However, it is preferred that the anti-jackknifing system of the present invention include two hydraulic pressure vessels mounted immediately lateral on each side of the trailer kingpin for controlling the extension and retraction of two pins. This preferred anti-jackknifing system includes a corresponding two race plates in which each race plate includes a partially circular slot for receipt of a pin.

The anti-jackknifing system of the present invention further includes a speed sensor for sensing the speed of the tractor trailer combination as it travels down the road. The speed sensor may also be of various types known by those skilled in the art including simply a sensor affixed to the tractor's speedometer or a global positioning system (GPS) module may be employed.

The anti-jackknifing system includes a control processor which is connected to the speed sensor and pressure vessels for controlling the extension and retraction of the pins. The controller may also be designed and constructed by those skilled in the art without undue experimentation. The control processor is electrically connected to a pneumatic or hydraulic switch mounted to the tractor or trailer which, in turn, causes air or fluid to travel to the pressure vessels for controlled extension and retraction of the pins.

In operation, the controller monitors the data produced by the speed sensor and causes the pins to extend into the race plate slots once it is determined that the tractor trailer combination has exceeded a predetermined threshold. Conversely, the controller also monitors data produced by the speed sensor to determine when the tractor trailer has reduced its speed below a predetermined threshold. Upon sensing the vehicle traveling below the predetermined speed, the controller transmits signals so as to cause the pressure vessels to retract the pins from the slots formed in the race plates. In order to insure that the pressure vessels and pins are not continuously activated and deactivated when the tractor trailer is continuously passing through the predetermined speed values, such as when the vehicle is traveling in heavy traffic conditions, preferably the controller causes the pins to extend or retract only once it is determined that the vehicle has traveled faster than the predetermined speed threshold for a predetermined time or is traveling below the predetermined speed threshold for a predetermined time. For example, in a preferred embodiment, the controller causes the pins to extend from the pressure vessels into the race plate slots only once it is determined that the tractor trailer has been traveling over the predetermined value of 40 miles per hour ("mph") for a predetermined time period of 5 seconds. Preferably, the controller also causes the pins to again retract from the race plate slots only after it is determined that the vehicle is traveling below 37 mph for 30 seconds or more. These speeds and times are suggested examples and those skilled in the art may determine that different times and speeds are appropriate for different vehicles and for different driving conditions. For example, the controller may be designed to include a manual switch allowing the driver to lock the pins in an extended position regardless of vehicle speed or to lower the predetermined speed thresholds for use when the driver is traveling in rain or icy conditions and the prospects of a low speed jackknifing condition are increased.

It is thus an object of the present invention to provide an anti-jackknifing system which requires minimal control or oversight by a driver.

It is also an object of the present invention to provide an anti-jackknifing system which is inexpensive to manufacture.

Still an additional object of the invention is to provide an anti-jackknifing system which can be incorporated in new tractor trailers or can be employed to retrofit older tractor trailers.

These and other and more specific objects and advantages of the invention will be apparent to those skilled in the art from the following detailed description taken in conjunction with the drawings.

DETAILED DESCRIPTION OF THE INVENTION

While the present invention is susceptible of embodiments in various forms, as shown in the drawings, hereinafter will be described the presently preferred embodiments of the invention with the understanding that the present disclosure is to be considered as an exemplification of the invention and it is not intended to limit the invention to the specific embodiments illustrated.

With reference to the drawings, the anti-jackknifing system of the present invention includes several primary components including pressure vessels 23, pins 25, race plates 27, a speed sensor 13, and an electronic control processor including a control module 11 and control switch 17.

The pressure vessels 23 may be hydraulic or pneumatic for extending or retracting the pins 25. In a preferred embodiment, the pressure vessels 23 are pneumatic and are connected to the air supplies found on existing tractors. Preferably, the anti-jackknifing system includes two pressure vessels which are mounted to a tractor so that the pins 25 are positioned laterally from the trailer's kingpin so that when the trailer rotates relative to the tractor, the pins are caused to move in a circular path concentric to the trailer kingpin. Preferably, pneumatic low pressure rated hose 19 connects the donating air-tank and/or compressor through the pneumatic switch 17 to the anti-jackknife pressure vessels 23. Upon increased pressure within the anti-jackknifing/jackknife limiting pressure vessels, the pins will project upwardly into range of motion governors (race plates described below) at a predetermined speed. Preferably, the pressure vessels 23 are made of steel, contain an internal pressure chamber and are operational at approximately 40 psi. Each pin 25 moves upwardly from the pressure vessel in response to increased air pressure provided by the air switch, and moves downwardly from the pressure vessel in response to decreased air pressure provided by the air switch.

As illustrated in FIGS. 1-6, in a first embodiment the anti-jackknifing/jackknife limiting pressure vessels and corresponding projecting pins 25 are integrated into a modified fifth wheel 7. The pressure vessels are formed within the fifth wheel body, and as shown in the Figures, the pins 25 project upwardly and downwardly from the fifth wheel itself. To this end, the fifth wheel coupler 7 on the tractor frame 3 is preferably constructed to include cylindrical reservoirs for receiving the pins 25 and are connected to hydraulic or pneumatic hoses 19 to fluid or air supplies. The cylindrical reservoir formed in the pressure vessels 23 are sized to slidably receive the pins 25. When in the upward position, the pins project into the race plates 27 mounted to the bottom of the trailer above the fifth wheel.

Figure 8:
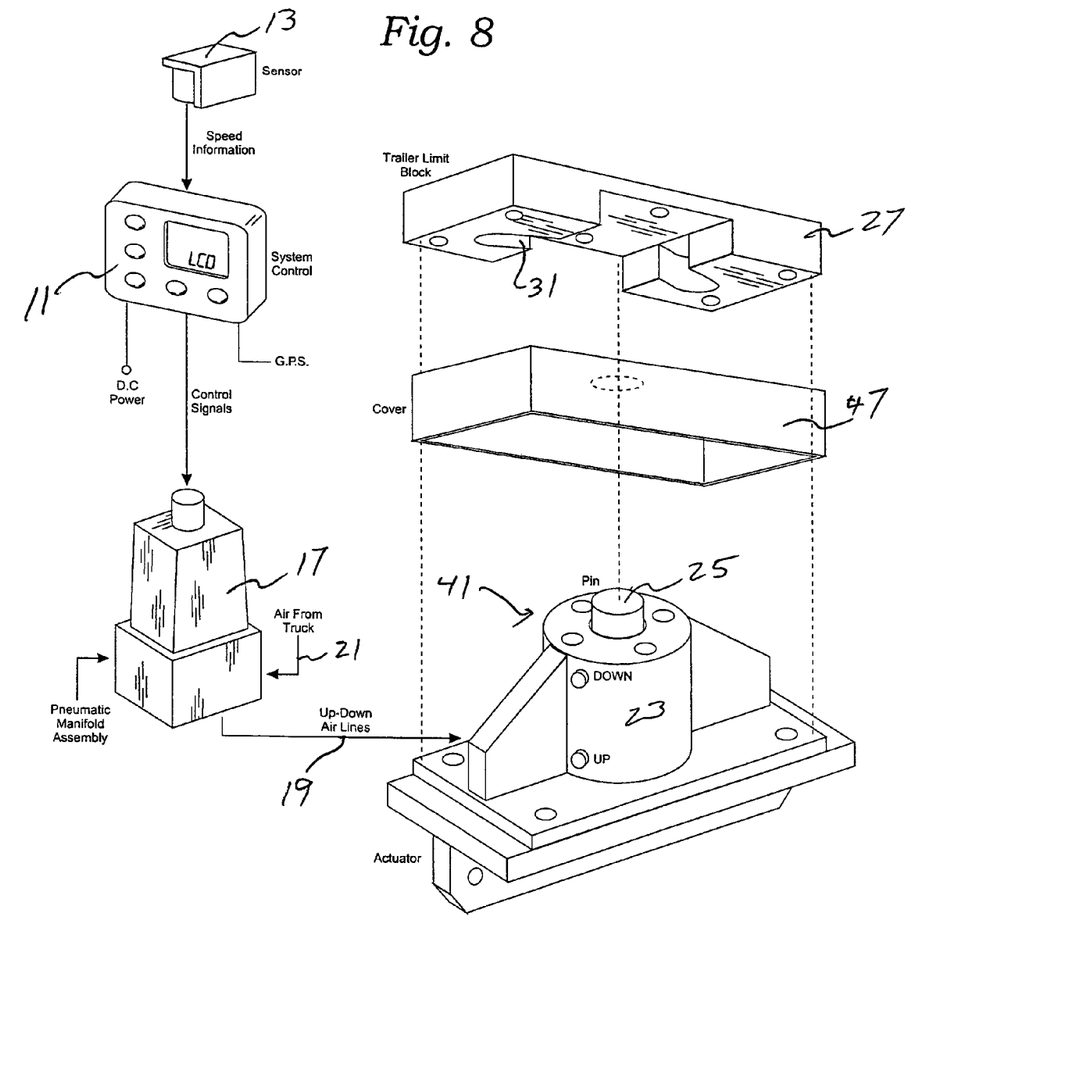
FIG. 8 is an exploded anti-jackknifing system of the present invention wherein the pressure vessels are positioned exterior to the fifth wheel.
Figure 9:
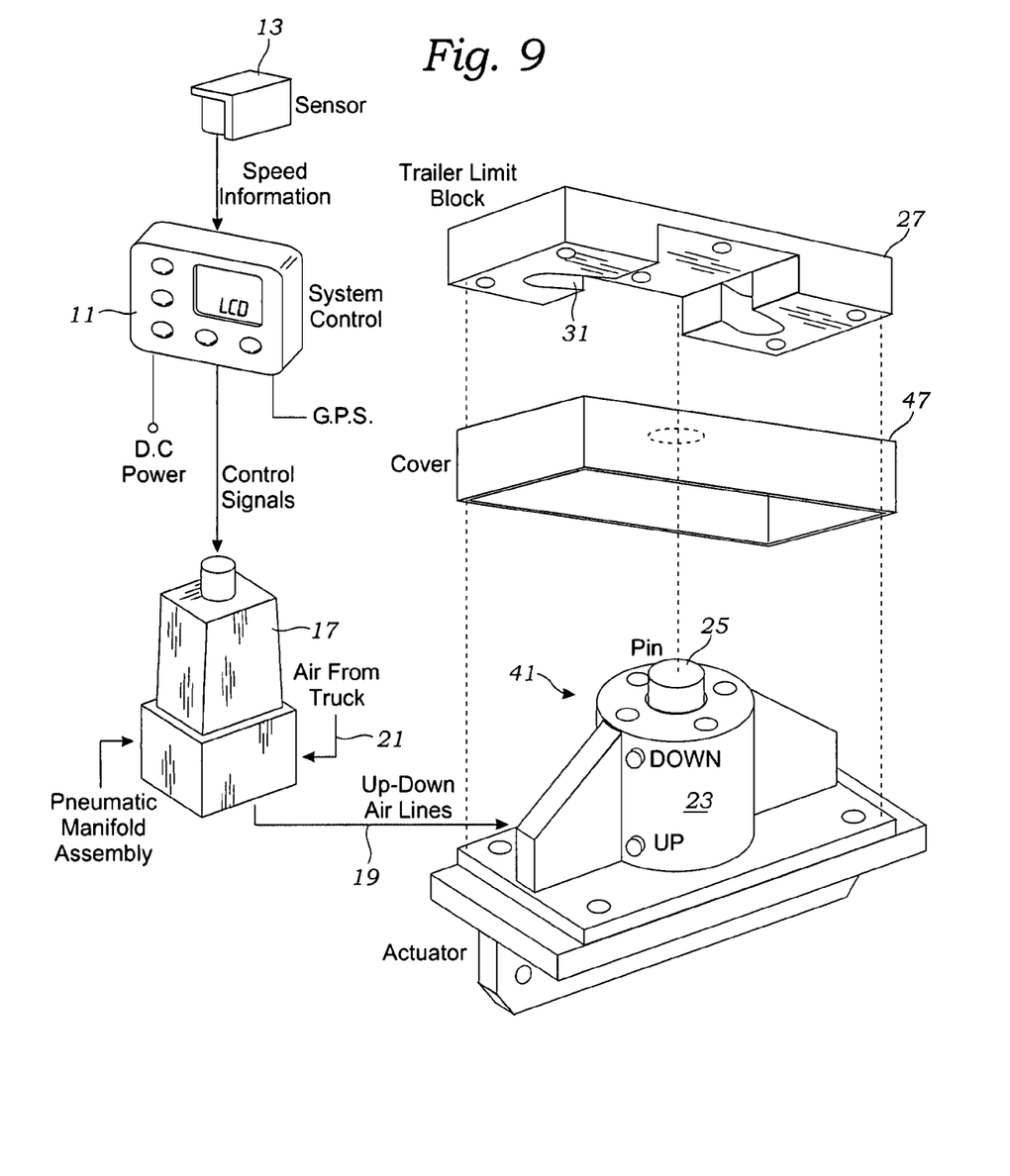
FIG. 9 is a diagram illustrating the various components of the anti-jackknifing system of the present invention.

As understood by those skilled in the art, it would be extremely costly to replace all existing fifth wheel couplers. Accordingly, as shown in FIGS. 8 & 9, in an additional embodiment of the invention, the pressure vessels are positioned as stand-alone units 41 which are installed upon existing vehicles to the left and right sides of the fifth wheel coupler 7. The stand alone units 41 are located directly across from one another, using the detent orifice (kingpin) on the fifth wheel as a direct locating plane and point of reference.

The pins 25 may be of various sizes and shapes depending on the sizes and weights of the tractor trailers on which the anti-jackknifing system is integrated. However, a preferred pin has a 2¼" diameter and is made of S/7 tool steel in a hardened and ground condition which has been hardened to 60 R/C.

The race plates 27 (preferably two to each semi-tractor trailer configuration) are preferably prehardened steel and include arcuate slots 31 sized for receipt of the projecting pins 25. The race plates are welded onto the bottom side of the trailer apron plate on both sides of the kingpin so as to align with the underlying pressure vessels 23 and corresponding pins 25 mounted on the tractor frame. Preferably, the race plates are positioned well away from the kingpin so as not to interfere with the king pin at any time.

The anti-jackknifing system includes a control processor which is connected to the speed sensor 13 and pressure vessels 23, and includes sufficient computer processing power, memory and software for causing the pressure vessels to activate and deactivate so as to cause their corresponding pins to extend or retract under predetermined conditions. The electronic controller may be located anywhere on the tractor or trailer, but a preferred construction includes an electronic control module 11 which houses the primary electronics and which is located within the tractor cab. The electronic control module may be hard mounted or temporarily mounted on the dashboard in the cab of the tractor by self sticking Velcro. A power harness from the control module to the vehicle battery will include the traditional positive, negative and ground wire, incorporating the accessory fuse box in the vehicle (or a separate fuse box if desired). The power harness preferably travels from the control module to the rear of the vehicle along the path of the truck's current wiring harness. A control/signal wire connects the electronic controller to the speed sensing device 13 which may take various forms such as a sensor connected to vehicle's speedometer cable, as a relay from the vehicle's speedometer electronic module, or as a separate GPS module.

The control processor incorporates or connects to an pneumatic or hydraulic switch 17 which allows compressed air or fluid from a pressurized supply (preferably the tractor's secondary air tank) to travel to the pressure vessels 23 located within each side of the fifth wheel coupler 7 (FIG. 6) or located as stand-alone units 41 on the tractor frame 3 (FIG. 8). Each pin 25 projects upwardly and downwardly in response to pressure within the pressure vessel 23 as supplied by the air or fluid supply as controlled by the switch 17. Various air or fluid supplies can be employed including use of the tractor's existing pneumatic system or separate stand alone compressors. Air switches can also be selected by those skilled in the art.

Installation of a preferred anti-jackknifing system is described as follows.

Installation of the control module is preferably mounted with self adhesive Velcro to the dashboard/console driver's area of the cab.

Power cable running from the control module to a fuse block is attached by zip-tie type fasteners Control cable assembly is run from the control module along the cab's wire harness/wire run to the rear of the vehicle attached along the way by zip-tie type fasteners until it reaches the speed sensor.

The modified fifth wheel coupler is installed upon the back of the tractor in normal manner. Alternatively, stand alone anti-jackknifing/jackknife limiting units 41 are fastened to the tractor frame by rated steel nuts and bolts through existing, factory pre-drilled holes. No drilling or welding of the frame is required.

Pneumatic Switch (air switch) is mounted by either stainless steel strapping or specialized fasteners (if available).

Pneumatic lines running from the donating air-tank to the pneumatic switch, to the anti-jackknifing/jackknife limiting units are attached by zip-tie type fasteners made of plastic or metal. Preferably, a very small volume from the $2^{nd}$ air tank of the tractor system provides 40 psi.

Twelve volts DC is utilized from the tractor trailer system to power the control module, pneumatic switch and speed sensor.

Race plates are welded onto/into the apron plate of the trailer with preferably one race plate on both sides of the kingpin (aligned to the units on the tractor frame).

The control unit 11 receives signals from a speed sensor 13 and at predetermined speeds, such as above 40 miles per hour, causes the valve system to allow pressurized air or fluid, such as at 40 psi, to travel to each of the anti-jackknifing pressure vessels. In addition, the control unit 11 receives signals from a speed sensor 13 and at predetermined speeds, such as below 37 miles per hour, causes the valve system to lower the pressure in the pressure vessels. In operation, at speeds over the predetermined value such as 40 miles per hour, the electronic control module 11 activates the air switch 17 to cause air to enter the pressure vessels 23. The pins 25 are forced upwardly into the race plates so as to restrict rotation of the tractor beyond the predetermined limits imposed by the race plates. Preferably, the controller only causes the extension of the pins only after the tractor trailer has exceeded the predetermined speed for a predetermined time period, such as 5 seconds. Conversely, the electronic control module also causes the pins to retract once it receives data from the speed sensor indicating that the vehicle speed has dropped below a predetermined threshold, such as 37 mph for a predetermined time period, such as 30 seconds.

Preferably also, the pins 25 are not dropped even if the speed of the vehicle drops below the predetermined speed in the event that vehicle is in a jackknife condition. To this end, the jackknife sensor produces a signal in the event of a jackknife condition which causes the electronic module to not drop the pressure in the pressure vessels 23, thereby preventing the pins 25 from retracting from the race plates 27 in the event of a jackknife in progress. Preferably, the controller is designed to include a manual switch allowing the driver to lock the pins in an extended position regardless of vehicle speed or to lower the predetermined speed thresholds for use in different driving condition.

Figure 6:
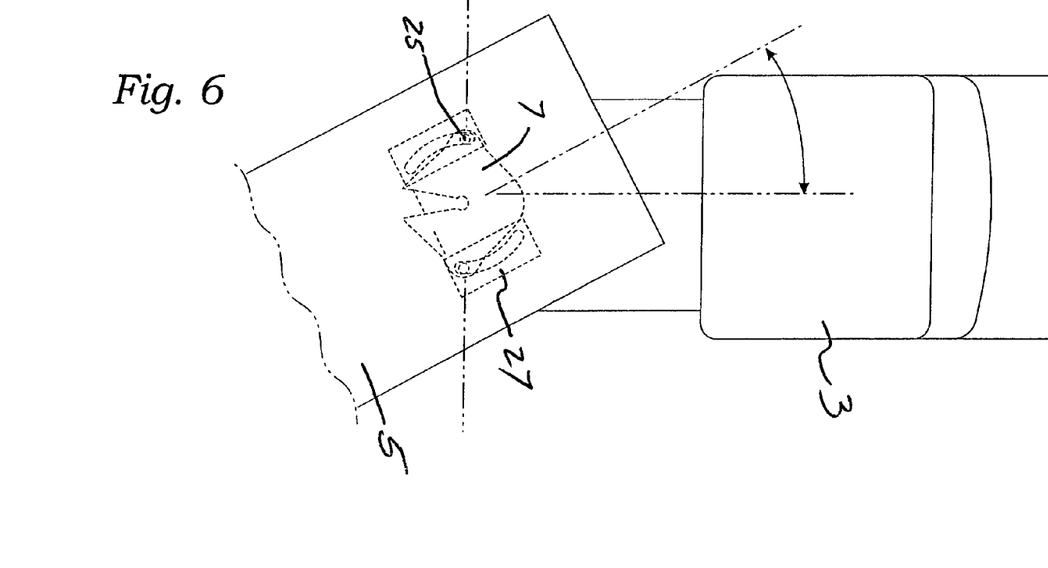
FIG. 6 is a top plan view of a tractor trailer combination including an anti-jackknifing system of the present invention.
Figure 7:
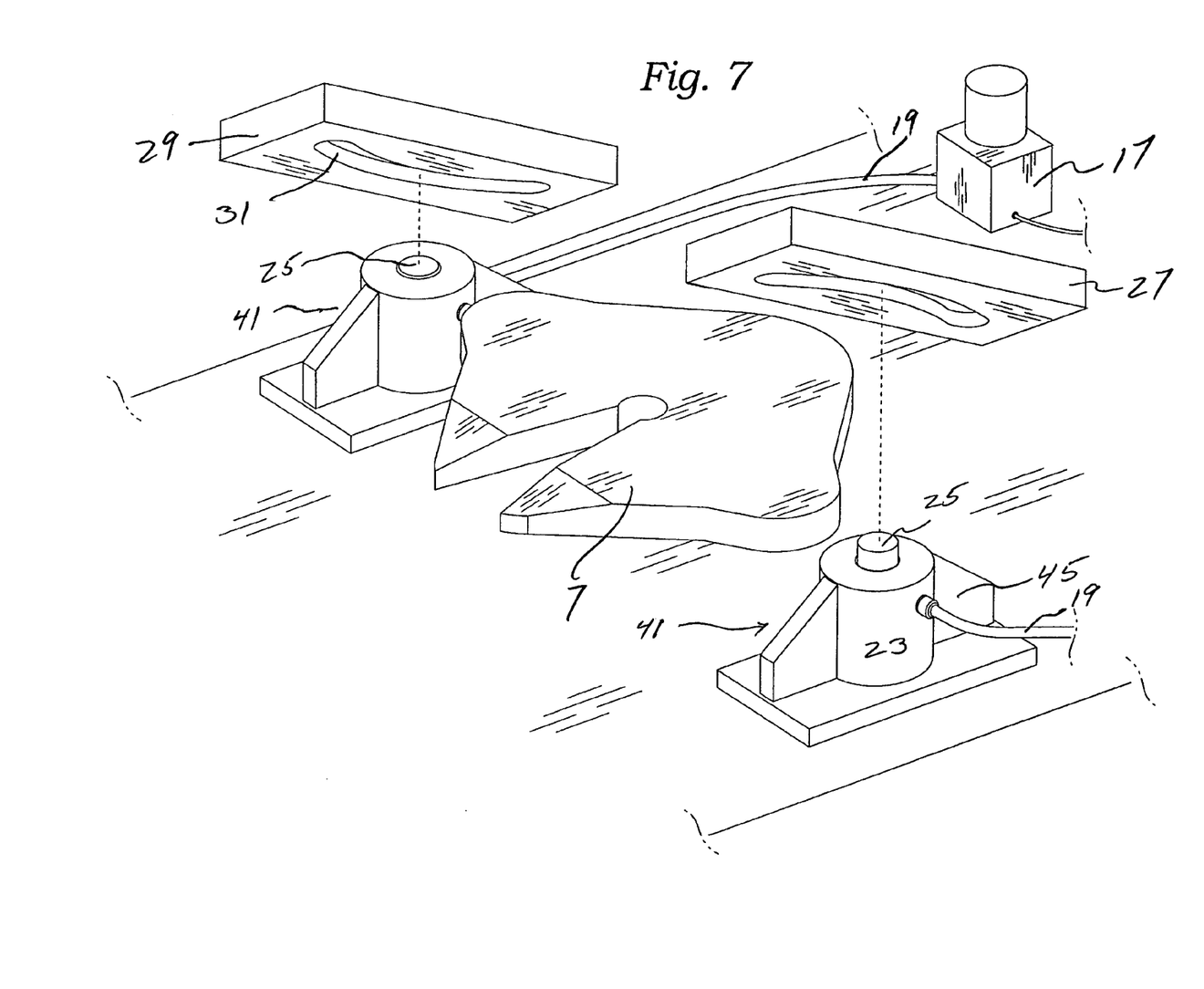
FIG. 7 is a top plan view of a tractor trailer combination illustrating the anti-jackknifing system of the present invention preventing a jackknife condition.

As illustrated in FIGS. 6 and 7, the anti-jackknifing system of the present invention prevents the trailer from rotating relative to the tractor more than a predetermined angle. In a preferred embodiment, the race plate's slots form partial circular structures extending 30° to thereby limit the trailer from rotating relative to the tractor more than 15° from center line. Though arcs of the slots may be increased or decreased to provide additional or reduced restriction to relative rotation of the trailer to the tractor, previous testing indicates that any rotation of a trailer relative to the tractor more than 18° provides an unacceptable jackknife condition. As illustrated in FIGS. 6 and 7, in the event that the tractor trailer is exceeding the predetermined speed and accordingly, the pins 25 are caused to project into the race plate slots 31, any rotation of the trailer beyond 15° is prevented by the pins engaging the race plates 27 where the slots end.

While several particular forms of the invention have been illustrated and described, it will be apparent that various modifications can be made without departing from the spirit and scope of the invention. Accordingly, it is not intended that the invention be limited except by the following claims.

We claim:

1. An anti-jackknifing system comprising:
   a tractor;
   a trailer;
   a fifth wheel coupler that connects the tractor to the trailer to form a tractor-trailer combination, the fifth wheel coupler including a downwardly extending kingpin mounted to the trailer and a fifth wheel plate mounted to the tractor, the fifth wheel plate rotatably receiving and affixing the kingpin to allow the trailer to rotate horizontally about the kingpin;
   one or more race plates affixed to the underside of the trailer the race plates each comprising a partially circular slot positioned concentrically to the kingpin;
   one or more pins mounted to the tractor and positioned to extend into and retract out from the partially circular slot in a corresponding one of the one or more race plates, rotation of the tractor relative to the trailer being restricted when the one or more pins are extended into their corresponding one or more race plate slots;
   one or more pneumatic or hydraulic pressure vessels that cause extension of the one or more pins into the one or more race slots when a pressure in the one or more pressure vessels is increased and retraction of the one or more pins out from out from the one or more race plate slots when the pressure in the one or more pressure vessels is decreased;
   a speed sensor that senses a current speed of the tractor-trailer combination; and
   a controller that receives speed data produced by the speed sensor, the controller providing a signal to the one or more pressure vessels that causes the pressure in the one or more pressure vessels to increase and thereby cause extension of the one or more pins into the one or more race slots when the speed data indicate that the current speed has exceeded a first threshold speed for a first predetermined period of time, the controller causing the pressure in the pressure vessel to decrease when the speed data indicate that the current speed has failed to exceed a second threshold speed for a second predetermined period of time, the second threshold speed being lower than the first threshold speed.

2. The anti-jackknifing system of claim 1, further comprising at least two race plates, at least two pins, and at least two pressure vessels.

3. The anti-jackknifing system of claim 2 wherein the at least two pressure vessels are integrated into the fifth wheel plate and the at least two pins extend and retract vertically from a top of the fifth wheel plate.

4. The anti-jackknifing system of claim 2, wherein the at least two pressure vessels are stand-alone units installable exterior to a fifth wheel plate.

5. The anti-jackknifing system of claim 1, wherein the first threshold speed is approximately 40 MPH, the second threshold speed is approximately 37 MPH, and the second predetermined period of time is approximately 30 seconds.

6. The anti-jackknifing system of claim 1, further comprising:
   a jackknife sensor that produces a signal to the controller if the jackknife sensor detects that the tractor-trailer combination is currently in a jackknife condition; and
   wherein upon receipt of the signal by the controller, the controller does not cause the pressure in the one or more pressure vessels to decrease when the speed data indicates that the current speed has failed to exceed the second threshold speed for the second predetermined period of time.

7. The anti-jackknifing system of claim 1, wherein the partially circular slot of each of the one or more race plates covers an angle of approximately 30° or less to limit rotation of the trailer relative to the tractor by approximately 15° or less from a centerline of the tractor-trailer combination.

8. An anti-jackknifing system comprising:
   a pressure vessel that is positioned on a tractor of a tractor-trailer combination;
   a pin that projects upwardly and downwardly in response to changes in pressure within the pressure vessel;
   a speed sensor that senses a current speed of the tractor-trailer combination; and
   a controller that monitors speed data produced by the speed sensor, the controller causing the pressure in the pressure vessel to increase when the speed data indicate that the current speed has exceeded a first threshold speed for a first predetermined period of time, increasing of the pressure in the pressure vessel causing the pin to project upwardly to interact with a curved slot on an underside of the trailer and to thereby restrict rotation of the tractor relative to the trailer, the controller causing the pressure in the pressure vessel to decrease when the speed data indicate that the current speed has failed to exceed a second threshold speed for a second predetermined period of time, the second threshold speed being lower than the first threshold speed, decreasing of the pressure in the pressure vessel causing the pin to project downwardly to not interact with the curved slot and to thereby not restrict rotation of the tractor relative to the trailer.

9. The anti-jackknifing system of claim 8, further comprising a second race plate having a second curved slot formed therein, a second pressure vessel, and a second pin that projects upwardly and downwardly in response to changes in pressure within the second pressure vessel.

10. The anti-jackknifing system of a tractor-trailer combination of claim 8, wherein the pressure vessel is integrated into a fifth wheel plate for mounting to a tractor and projects upwardly and downwardly from a top of the fifth wheel plate.

11. The anti-jackknifing system of claim 8, wherein the pressure vessel is a stand-alone unit that installs exterior to a fifth wheel plate.

12. The anti-jackknifing system of claim 8, wherein the first threshold speed is approximately 40 MPH, the second threshold speed is approximately 37 MPH, and the second predetermined period of time is approximately 30 seconds.

13. The anti-jackknifing system of claim 8, further comprising:
   a jackknife sensor that produces a signal to the controller if the jackknife sensor detects that the tractor-trailer combination is currently in a jackknife condition; and
   wherein upon receipt of the signal by the controller, the controller does not cause the pressure in the pressure vessel to decrease when the speed data indicates that the current speed has failed to exceed the second threshold speed for the second predetermined period of time.

14. The anti-jackknifing system of claim 8, further comprising a race plate that attaches to the underside of the trailer, the race plate comprising the curved slot, the curved slot defining a circular arc.

15. The anti-jackknifing system of claim 14, wherein the circular arc covets an angle of approximately 30° or less to limit rotation of the trailer relative to the tractor by approximately 15° or less from a centerline of the tractor-trailer combination.

16. The anti-jackknifing system of claim 8, wherein the pressure vessel comprises a pneumatic pressure vessel or a hydraulic pressure vessel.

17. The anti-jackknifing system of claim 8, further comprising a manual switch that, when activated, causes the pin to project upwardly regardless of the current speed of the tractor-trailer combination.

18. The anti-jackknifing system of claim 8, further comprising a manual switch operable by a user to lower one or more of the first and second threshold speeds.

19. A method for preventing jackknifing; comprising:
receiving, at a controller, speed data for a tractor-trailer combination produced by a speed sensor that senses a current speed of the tractor-trailer combination, the tractor-trailer combination comprising a tractor, a trailer, and a fifth wheel coupler that connects the tractor to the trailer to form the tractor-trailer combination, the fifth wheel coupler including a downwardly extending kingpin mounted to the trailer and a fifth wheel plate mounted to the tractor, the fifth wheel plate rotatably receiving and affixing the kingpin to allow the trailer to rotate horizontally about the kingpin;
sending a first signal from the controller to a pressure vessel on the tractor to increase a pressure within the pressure vessel and thereby cause a pin to project upwardly to interact with a curved slot on an underside of the trailer and to thereby restrict rotation of the tractor relative to the trailer, the sending of the first signal occurring when the speed data indicate that the current speed has exceeded a first threshold speed for a first predetermined period of time;
sending a second signal from the controller to the pressure vessel on the tractor to decrease the pressure within the pressure vessel and thereby cause the pin to retract downwardly to no longer interact with the curved slot on the underside of the trailer and to thereby not restrict rotation of the tractor relative to the trailer, the sending of the second signal occurring when the speed data indicate that the current speed has not exceeded a second threshold speed for a second predetermined period of time, the second speed threshold speed being lower than the first threshold speed.

20. The method for preventing jackknifing of claim 19, further comprising:
receiving a third signal from a jackknife sensor, the third signal indicating that the tractor-trailer combination is currently in a jackknife condition; and
not sending the second signal when the speed data indicates that the current speed has failed to exceed the second threshold speed for the second predetermined period of time.

* * * * *